United States Patent
Imanishi et al.

(10) Patent No.: US 10,247,226 B2
(45) Date of Patent: Apr. 2, 2019

(54) CRANKSHAFT FOR RECIPROCATING ENGINE

(71) Applicant: NIPPON STEEL & SUMITOMO METAL CORPORATION, Tokyo (JP)

(72) Inventors: Kenji Imanishi, Kishiwada (JP); Kenji Tamura, Takatsuki (JP); Ken Yoshino, Guangdong (CN); Kunihiro Yabuno, Matsubara (JP); Koichiro Ishihara, Kyoto (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/735,496

(22) PCT Filed: Jun. 6, 2016

(86) PCT No.: PCT/JP2016/066732
§ 371 (c)(1),
(2) Date: Dec. 11, 2017

(87) PCT Pub. No.: WO2016/199711
PCT Pub. Date: Dec. 15, 2016

(65) Prior Publication Data
US 2018/0156263 A1    Jun. 7, 2018

(30) Foreign Application Priority Data

Jun. 12, 2015 (JP) .................................. 2015-119017

(51) Int. Cl.
*F16C 3/04* (2006.01)
*F16F 15/24* (2006.01)
(Continued)

(52) U.S. Cl.
CPC .................. *F16C 3/20* (2013.01); *F16C 3/08* (2013.01); *F16F 15/24* (2013.01); *F16F 15/283* (2013.01);
(Continued)

(58) Field of Classification Search
CPC ...... F16C 3/06; F16C 3/08; F16C 3/14; F16C 3/20; F16C 2202/06; F16C 2360/22; F16F 15/24; F16F 15/283
See application file for complete search history.

(56) References Cited

U.S. PATENT DOCUMENTS 45,365 A  *  12/1864  Anden  ...................... F16C 3/14
                                                  74/605
1,749,807 A  *  3/1930  Ford  ......................... F16C 3/20
                                                  74/603
(Continued)

FOREIGN PATENT DOCUMENTS

DE          714558 C  *  12/1941  ................ F16C 3/08
DE        2160586 A1  *  6/1973  ................ F16C 3/08
(Continued)

OTHER PUBLICATIONS

Machine translation of WO 2015/056440 A1 obtained on Jun. 21, 2018. (Year: 2018).*
(Continued)

*Primary Examiner* — Adam D Rogers
(74) *Attorney, Agent, or Firm* — Greer Burns & Crain Ltd.

(57) ABSTRACT

A crankshaft includes journals serving as a central axis of rotation, crank pins decentered from the journals, and crank arms connecting the journals and the crank pins. Some or all of the crank arms have counterweights integrated therewith. At least one of the crank arms has a recess in a crank pin facing surface. The crank arm includes ribs formed respec-
(Continued)

tively in two side portions of the recess along a periphery of the crank arm.

6 Claims, 17 Drawing Sheets

(51) Int. Cl.
*F16C 3/20* (2006.01)
*F16C 3/08* (2006.01)
*F16F 15/28* (2006.01)
*F16C 3/14* (2006.01)

(52) U.S. Cl.
CPC ............ *F16C 3/14* (2013.01); *F16C 2202/06* (2013.01); *F16C 2360/22* (2013.01)

(56) References Cited

U.S. PATENT DOCUMENTS

| | | | | |
|---|---|---|---|---|
| 3,747,433 A * | 7/1973 | Crowe | ............... | F16C 3/10 74/570.1 |
| 4,356,741 A * | 11/1982 | Schopf | ............... | F16C 3/08 29/6.01 |
| 5,435,059 A * | 7/1995 | Chawla | ............... | F16C 3/20 29/888.08 |
| 5,894,763 A * | 4/1999 | Peters | ............... | F16C 3/10 123/197.4 |
| 6,164,159 A * | 12/2000 | Saker | ............... | F16C 9/04 123/197.4 |
| 7,367,303 B2 * | 5/2008 | Yamamoto | ............... | F16C 3/08 123/192.1 |
| 8,468,696 B2 * | 6/2013 | Ohnuma | ............... | B21J 5/02 29/6.01 |
| 8,826,773 B2 * | 9/2014 | Walters | ............... | F16C 3/08 74/603 |
| 9,568,039 B2 * | 2/2017 | Minton | ............... | F16F 15/26 |
| 2016/0250679 A1 * | 9/2016 | Tamura | ............... | B21K 1/08 29/888.08 |
| 2016/0256917 A1 * | 9/2016 | Tamura | ............... | B21K 1/08 |
| 2016/0258476 A1 * | 9/2016 | Ishihara | ............... | F16C 3/08 |
| 2017/0167529 A1 * | 6/2017 | Ishihara | ............... | F16C 3/20 |
| 2017/0184146 A1 * | 6/2017 | Ishihara | ............... | F16C 3/08 |
| 2017/0234360 A1 * | 8/2017 | Ishihara | ............... | F16C 3/06 74/596 |

FOREIGN PATENT DOCUMENTS

| | | | | |
|---|---|---|---|---|
| DE | 3728142 A1 | | 8/1988 | |
| DE | 4136331 A1 * | | 5/1992 | ............... F16C 3/20 |
| DE | 19916492 A1 * | | 10/2000 | ............... F16C 3/08 |
| DE | 102008047551 A1 | | 4/2010 | |
| DE | 102009039301 A1 * | | 3/2011 | ............... F16C 3/06 |
| EP | 0237718 A2 * | | 9/1987 | ............... F16C 3/14 |
| EP | 3231530 A1 | | 10/2017 | |
| EP | 3299096 A1 | | 3/2018 | |
| FR | 2930007 A1 * | | 10/2009 | ............... F16C 3/14 |
| GB | 590977 A * | | 8/1947 | ............... F16C 3/14 |
| GB | 1090446 A * | | 11/1967 | ............... F16C 3/08 |
| JP | 60104812 A * | | 6/1985 | ............... F16C 3/06 |
| JP | 2000-320531 | | 11/2000 | |
| JP | 2009-133331 | | 6/2009 | |
| JP | 2010-255834 | | 11/2010 | |
| JP | 2011017399 A * | | 1/2011 | ............... F16C 3/08 |
| WO | 2006057593 A1 | | 6/2006 | |
| WO | WO-2006057593 A1 * | | 6/2006 | ............... B21K 1/08 |
| WO | WO-2015056440 A1 * | | 4/2015 | ............... F16C 3/08 |

OTHER PUBLICATIONS

Machine translation of FR 2930007 A1 obtained on Jun. 21, 2018. (Year: 2018).*
Machine translation of JP 2000-320531 A obtained on Jun. 21, 2018. (Year: 2018).*
Machine translation of JP 2009-133331 A obtained on Jun. 21, 2018. (Year: 2018).*
Machine translation of JP 60-104812 A obtained on Jun. 21, 2018. (Year: 2018).*
ISR issued in Int'l. App. No. PCT/JP2016/066732, dated Aug. 23, 2016.
European Search Report issued in EP App. No. 16 80 7418.5, dated Oct. 18, 2018.

* cited by examiner

IX C-IX C

IX D-IX D

IX E-IX E

X C-X C

X D-X D

X E-X E

XI C-XI C

XI D-XI D

XI E-XI E

CRANKSHAFT FOR RECIPROCATING ENGINE

This is a National Phase Application filed under 35 U.S.C § 371, of International Application No. PCT/JP2016/066732, filed Jun. 6, 2016, the contents of which are incorporated by reference.

TECHNICAL FIELD

The present invention relates to a crankshaft to be mounted in a reciprocating engine such as an automotive engine, a marine engine, and a multiple purpose engine used in, for example, a power generator.

BACKGROUND ART

A reciprocating engine requires a crankshaft to extract power by converting reciprocating motions of pistons in cylinders to rotational motion. There are two types of crankshafts: the type manufactured by die forging and the type manufactured by casting. Especially for multi-cylinder engines with two or more cylinders, the firstly mentioned die forged crankshafts that are excellent in strength and stiffness are often employed.

FIGS. 1 and 2 are side views schematically showing exemplary crankshafts for common multi-cylinder engines. The crankshafts 1 shown in FIGS. 1 and 2 are to be mounted in four-cylinder engines. Each of the crankshafts 1 includes five journals J1 to J5, four crank pins P1 to P4, a front part Fr, a flange Fl, and eight crank arms (which will hereinafter be referred to simply as "arms") A1 to A8 that connect the journals J1 to J5 and the pins P1 to P4 to each other.

The crankshaft 1 shown in FIG. 1 includes counterweights W1 to W8 (which will hereinafter be referred to simply as "weights") that are integrated with the eight arms A1 to A8, respectively. The crankshaft 1 is called a four-cylinder eight-counterweight crankshaft.

In the following paragraphs, when the journals J1 to J5, the pins P1 to P4, the arms A1 to A8, and the weights W1 to W8 are each collectively referred to, a reference character "J" is used for the journals, a reference character "P" for the pins, a reference character "A" for the arms, and a reference character "W" for the weights. A pin P and a couple of arms A (including weights W) connecting with the pin P are collectively referred to as a "throw".

In the crankshaft 1 shown in FIG. 2, the front first arm A1, the rearmost eighth arm A8, and the two central arms (the fourth arm A4 and the fifth arm A5) have weights W integrated therewith. The other arms, namely, the second, the third, the sixth and the seventh arms A2, A3, A6 and A7 have no weights. This crankshaft 1 is called a four-cylinder four-counterweight crankshaft.

The journals J, the front part Fr and the flange Fl are arranged coaxially with the center of rotation of the crankshaft 1. Each of the pins P is located away from the center of rotation of the crankshaft by a distance corresponding to a half piston stroke. The journals J are supported by an engine block via slide bearings, and serve as a central axis of rotation. Each of the pins P is coupled to a big end of a connecting rod (which will hereinafter be referred to also as a "conrod") via a slide bearing, and a piston is coupled to a small end of the conrod. The front part Fr is the front end of the crankshaft 1. A damper pulley 2 configured to drive a timing belt, a fan belt and so on is attached to the front part Fr. The flange Fl is the rear end of the crankshaft 1. A fly wheel 3 is attached to the flange Fl.

In an engine, fuel explodes inside the cylinders. The combustion pressures generated by the explosions act on the pins P of the crankshaft 1 via pistons and conrods. Meanwhile, the journals J are supported by bearings fixed to the engine block. Therefore, the arms A connecting the pins P and the journals J receive flexural loads and torsional loads. Then, the crankshaft 1 rotates while elastically deforming repeatedly in response to the different kinds of loads.

When the elastic deformation of the crankshaft 1 is great, the thicknesses of the oil films in the bearings supporting the journals J greatly change. This may cause galling in the bearings. Besides, the resistance to the rotations of the journals may increase, thereby causing a reduction in fuel economy performance. For this reason, it is preferred that the elastic deformation of the crankshaft 1 is small.

The amount of elastic deformation of the crankshaft 1 depends on the stiffness of the crankshaft 1 (especially the arms A). Since it is preferred that the elastic deformation is small, it is preferred that the stiffness is high. Usually however, an increase in the stiffness of the crankshaft 1 leads to an increase in the weight of the crankshaft 1.

Thus, there is a trade-off between increasing the stiffness of the arms A of the crankshaft 1 and reducing the weight of the crankshaft 1. In order to comply with both of the demands, various techniques relating to the arm shape have been suggested. There are conventional techniques as follows.

Japanese Patent Application Publication No. 2010-255834 (Patent Literature 1) discloses a crankshaft including an arm with a recess in the pin-facing surface. FIGS. 3A and 3B are schematic diagrams showing an arm shape similar to that disclosed in FIG. 3 of Patent Literature 1. FIG. 3A is a side view, and FIG. 3B is a front view from the pin side in the axial direction. The recess 10 extends across the entire width of the arm A.

Japanese Patent Application Publication No. 2000-320531 (Patent Literature 2) discloses a crankshaft including an arm with a recess and a reinforcing rib in the recess. The reinforcing rib is formed along a line Ac (which will hereinafter be referred to as an "arm centerline") connecting the axis Jc of a journal J and the axis Pc of a pin P.

CITATION LIST

Patent Literatures

Patent Literature 1: Japanese Patent Application Publication No. 2010-255834
Patent Literature 2: Japanese Patent Application Publication No. 2000-320531

SUMMARY OF INVENTION

Technical Problems

With the technique disclosed in Patent Literature 1, a weight reduction of a crankshaft is accomplished by the formation of a recess while the stiffness of the arm is maintained. However, an increase in the stiffness cannot be expected. With the technique disclosed in Patent Literature 2, a weight reduction of a crankshaft is accomplished by the formation of a recess, and further, an increase in the flexural rigidity can be expected from the formation of a rib along the arm centerline. However, an increase in the torsional rigidity cannot be expected.

In view of such situations, the present invention has been made. An object of the present invention is to provide a crankshaft for a reciprocating engine with an increased flexural rigidity and an increased torsional rigidity as well as with a reduced weight.

Solutions to Problems

A crankshaft for a reciprocating engine according to an embodiment of the present invention includes journals serving as a central axis of rotation, crank pins decentered from the journals, and crank arms connecting the journals and the crank pins. One or more of the crank arms have counterweights integrated therewith. At least one of the crank arms with counterweights has a recess in a crank pin-facing surface. The at least one of the crank arms with counterweights includes a rib formed in one side portion of the recess along a periphery of the crank arm.

Advantageous Effects of Invention

In the crankshaft according to the present invention, at least one of the crank arms with counterweights has a recess in a pin-facing surface, and a rib is formed in at least one of the two side portions of the recess. Accordingly the side portion is thickened by the rib, and the area inside of the side portion is thinned by the recess. This allows the crankshaft to have an increased flexural rigidity and an increased torsional rigidity as well as a reduced weight.

DESCRIPTION OF EMBODIMENTS

Crankshafts for reciprocating engines according to some embodiments of the present invention will hereinafter be described.

A crankshaft according to an embodiment of the present invention includes journals serving as a central axis of rotation, crank pins decentered from the journals, and crank arms connecting the journals and the crank pins. One or more of the crank arms have counterweights integrated therewith. At least one of the crank arms with counterweights has a recess in the crank pin-facing surface. In at least one of the two side portions of the recess, a rib is formed along the periphery of the crank arm.

In the crankshaft according to the present embodiment, a crank arm with a counterweight has a recess in the pin-facing surface, and a rib is formed in at least one of the two side portions of the recess. Accordingly, the side portion of the arm is thick because of the rib, and the area inside of the side portion is thin because of the recess. Consequently, the crankshaft has an increased flexural rigidity and an increased torsional rigidity as well as a reduced weight.

In the crankshaft, it is preferred that two ribs are formed respectively in the two side portions of the recess. This results in a further increase in the flexural rigidity and a further increase in the torsional rigidity of the crankshaft.

The crankshaft preferably includes the following configuration. The one or two ribs extend from the end of the recess near an adjacent crank pin to a point shifted off from a center of rotation of the crankshaft toward the counterweight. When the crank arm is viewed from a side, the end of each of the ribs near the counterweight is located in a range from the axis of an adjacent journal to a point nearest to the counterweight among the points of intersection between the outer periphery of the journal and the crank arm. In this case, it is possible to increase the flexural rigidity and the torsional rigidity while minimizing an increase in weight due to the ribs.

The crankshaft preferably includes the following configuration. When the crank arm is viewed from a side, the top face of each of the ribs is parallel to a straight line connecting a point nearest to the counterweight among the points of intersection between the outer periphery of the pin and the crank arm and the point nearest to the counterweight among the points of intersection between the outer periphery of the journal and the crank arm. In this case, it is possible to suppress an increase in weight while ensuring high flexural rigidity.

Figure 1:
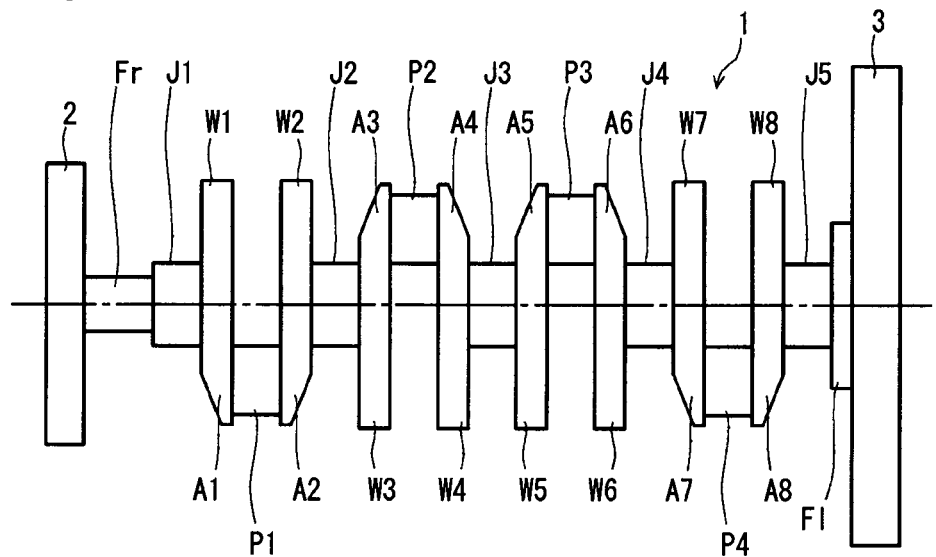
FIG. 1 is a side view schematically showing an exemplary crankshaft for a common multi-cylinder engine.
Figure 2:
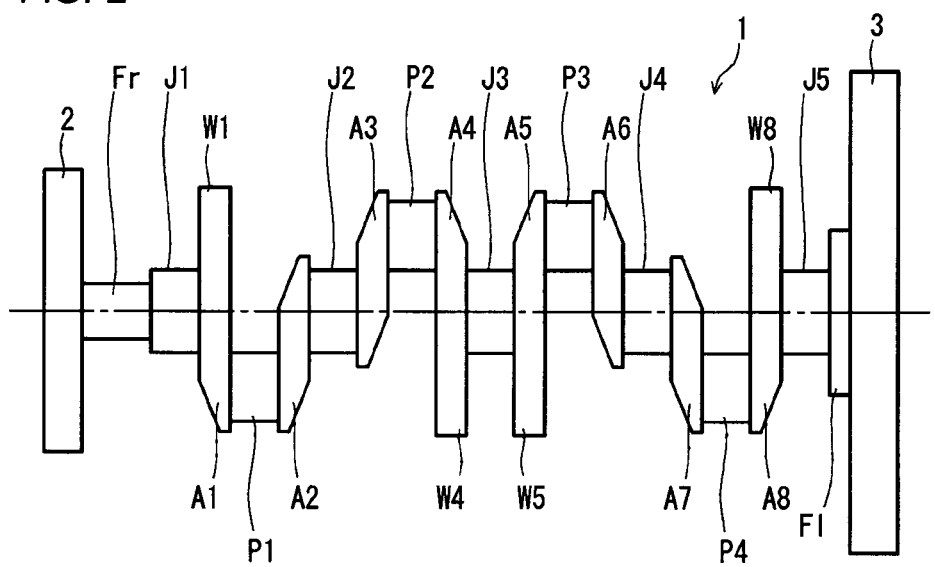
FIG. 2 is a side view schematically showing another exemplary crankshaft for a common multi-cylinder engine.
Figure 3A:
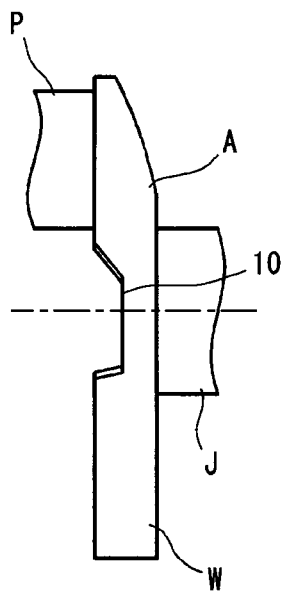
FIG. 3A is a side view of an arm of a crankshaft disclosed in Patent Literature 1, schematically showing an exemplary arm shape.
Figure 3B:
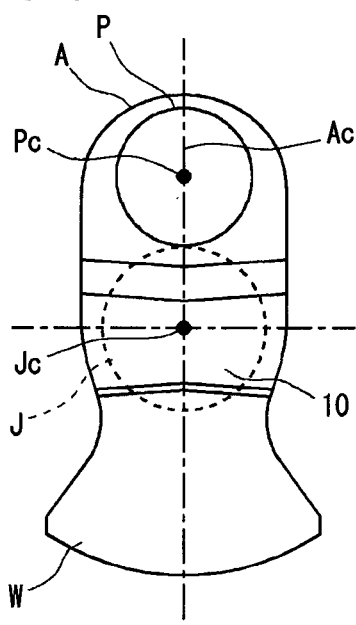
FIG. 3B is a front view of the arm of the crankshaft disclosed in Patent Literature 1 when the arm is viewed from the pin side in the axial direction, schematically showing the exemplary arm shape.
Figure 4:
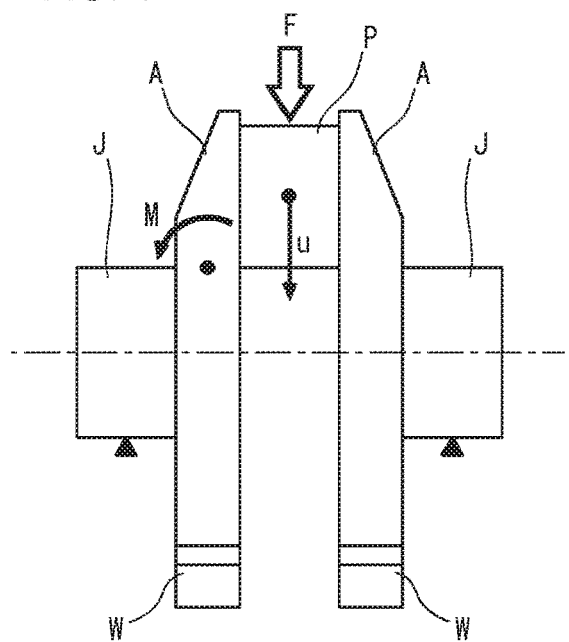
FIG. 4 is a schematic diagram illustrating a method for evaluating the flexural rigidity of an arm.

1. Basic Techniques to Consider in Designing Crankshaft
1-1. Flexural Rigidity of Arm FIG. 4 is a schematic diagram illustrating a method for evaluating the flexural rigidity of an arm. As shown in FIG. 4, in each throw of a crankshaft, a load F of combustion pressure generated by an explosion in a cylinder is applied to a pin P via a conrod. Since the journals J on both sides of the throw are supported by bearings, the load F is transmitted to the journal bearings from the pin P via the arms A. Then, each of the arms A is subjected to a load of three-point bending, and a bending moment M acts on the arm A. Accordingly, in each of the arms A, compressive stress occurs at the outside in the thickness direction (the side adjacent to the journal J), and tensile stress occurs at the inside in the thickness direction (the side adjacent to the pin P).

When the diameters of the pins P and the journals J are determined as design specifications, the flexural rigidity of each of the arms A depends on the shapes of the arms in the throw. The weights W make almost no contribution to the flexural rigidity. In this regard, the displacement u in the combustion pressure direction of the pin P at a point in the center of the pin P with respect to the axial direction is proportional to the load F of combustion pressure and is inversely proportional to the flexural rigidity, as shown in the following formula (1).

$$u \text{ proportional to } F/(\text{flexural rigidity}) \quad (1)$$

1-2. Torsional Rigidity of Arm

Figure 5A:
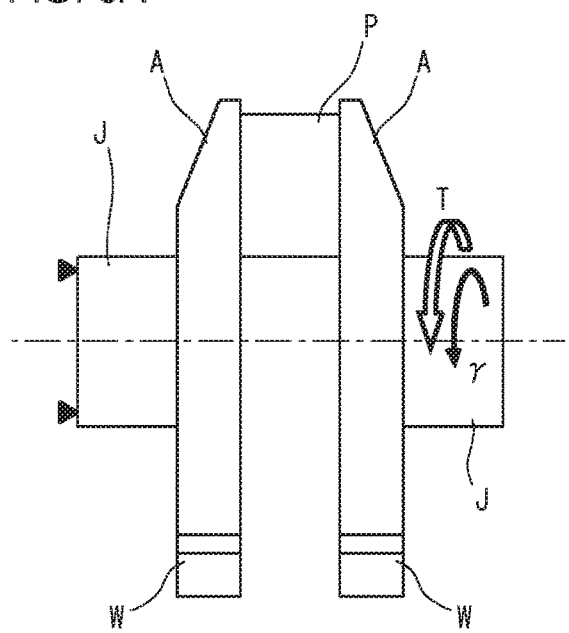
FIG. 5A is a schematic diagram illustrating a method for evaluating the torsional rigidity of an arm, the schematic diagram being a side view of a throw.
Figure 5B:
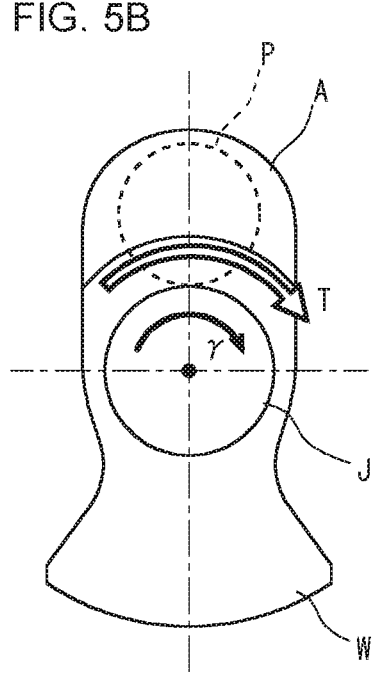
FIG. 5B is a schematic diagram illustrating the method for evaluating the torsional rigidity of an arm, the schematic diagram being a front view of a throw in the axial direction.

FIGS. 5A and 5B are schematic views illustrating a method for evaluating the torsional rigidity of an arm. FIG. 5A is a side view of a throw, and FIG. 5B is a front view of a throw when the throw is viewed in an axial direction. Since the crankshaft rotates around the journals J, a torsional torque T occurs.

When the diameters of the pins P and the journals J are determined as design specifications, the torsional rigidity of each of the arms A depends on the shapes of the arms in the throw. The weights W make almost no contribution to the torsional rigidity. In this regard, the torsion angle γ of the journal J is proportional to the torsional torque T and is inversely proportional to the torsional rigidity, as shown in the following formula (2).

$$\gamma \text{ proportional to } T/(\text{torsional rigidity}) \quad (2)$$

2. Crankshaft According to Present Embodiment
2-1. Approach for Increasing Stiffness of Arms As mentioned above, the counterweights make almost no contribution to the flexural rigidity and the torsional rigidity of the arms. The present embodiment is to present an arm shape that leads to an increase in flexural rigidity and an increase in torsional rigidity as well as a reduction in weight.

2-1-1. Shape for Increasing Torsional Rigidity

A typical shape for increasing the torsional rigidity will hereinafter be discussed based on the theory of Strength of Materials. In order to increase the torsional rigidity of an arm A while keeping the weight the same, it is effective to increase the polar moment of inertia.

Figure 6A:
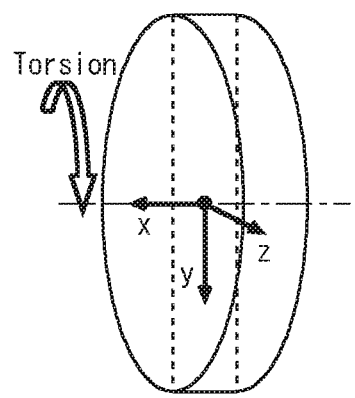
FIG. 6A is a diagram showing a typical example of an arm when the arm is assumed to be a simple circular disk with a rectangular cross-sectional shape.
Figure 6A:
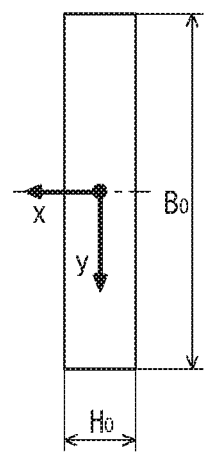
Figure 6B:
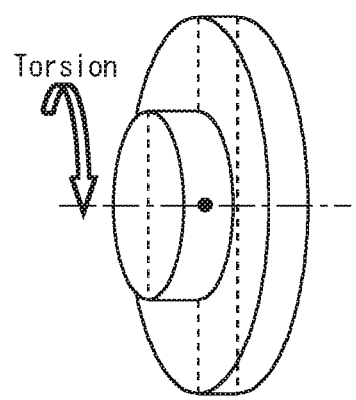
FIG. 6B is a diagram showing a typical example of an arm when the arm is assumed to be a simple circular disk with a protruded cross-sectional shape.
Figure 6B:
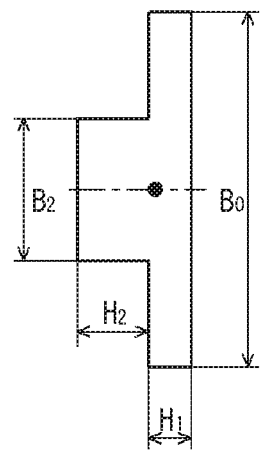
Figure 6C:
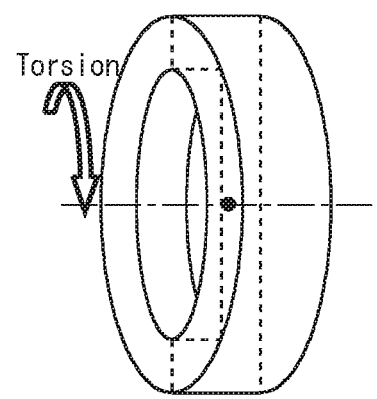
FIG. 6C is a diagram showing a typical example of an arm when the arm is assumed to be a simple circular disk with a recessed cross-sectional shape.
Figure 6C:
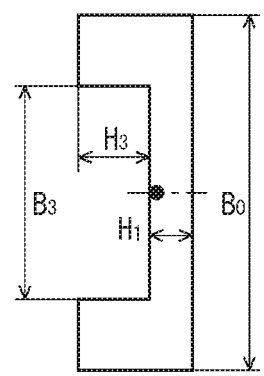

FIGS. 6A to 6C are diagrams showing typical examples of arms when the arms are assumed to be simple circular disks from the viewpoint of Strength of Materials, with respect to the torsional rigidity. FIG. 6A shows a rectangular cross-sectional disk, FIG. 6B shows a protruded cross-sectional disk, and FIG. 6C shows a recessed cross-sectional disk. In each of FIGS. 6A to 6C, the upper diagram is a perspective view, and the lower diagram is a sectional view. The rectangular cross-sectional disk shown in FIG. 6A, the protruded cross-sectional disk shown in FIG. 6B and the recessed cross-sectional disk shown in FIG. 6C have the same weight. Accordingly, these disks are the same in volume though the cross-sectional shapes of these disks are different, namely, rectangular, protruded and recessed, respectively.

Specifically, the rectangular cross-sectional disk shown in FIG. 6A has a rectangular cross-sectional shape, a thickness of $H_0$ and a diameter of $B_0$. The protruded cross-sectional disk shown in FIG. 6B has a protruded cross-sectional shape with a protrusion in the center, that is, the central portion of the protruded cross-sectional disk projects from the peripheral portion thereof. The outermost circumference of the protruded cross-sectional disk has a diameter of $B_0$. The protrusion in the center has a thickness of $H_2$ and a diameter of $B_2$, and the peripheral portion has a thickness of $H_1$. The recessed cross-sectional disk shown in FIG. 6C has a recessed cross-sectional shape with a recess in the center, that is, the central portion of the recessed cross-sectional disk is set back from the peripheral portion thereof. The outermost circumference of the recessed cross-sectional disk has a diameter of $B_0$. The recessed central portion has a thickness of $H_1$, and the recess has a depth of $H_3$ and a diameter of $B_3$.

The magnitude relationship among these circular disks in torsional rigidity is investigated under the condition that they are of equal weight. In general, according to the theory of Strength of Materials, there are relationships among torsional rigidity, polar moment of inertia and torsion angle as shown in the following formulae (3) to (5). The relationships shown in the formulae indicate that increasing the polar moment of inertia is effective at increasing the torsional rigidity.

$$\text{Torsional rigidity: } G \times J/L \quad (3)$$

$$\text{Polar moment of inertia: } J=(\pi/32) \times d^4 \quad (4)$$

$$\text{Torsion angle: } \gamma = T \times L/(G \times J) \quad (5)$$

where L represents the axial length, G represents the modulus of rigidity, d represents the radius of the round bar, and T represents the torsional torque.

The condition that the three types of circular disks shown in FIGS. 6A to 6C are of equal weight means the condition that they are of equal volume. Accordingly, the relationship indicated by the following formula (6) is established among the dimensional parameters of the three types of circular disks.

$$(\pi/4) \times B_0 \times B_0 \times H_0 = (\pi/4) \times (B_0 \times B_0 \times H_1 + B_2 \times B_2 \times H_2) = (\pi/4) \times \{B_0 \times B_0 \times (H_1 + H_3) - B_3 \times B_3 \times H_3)\} \quad (6)$$

The polar moments of inertia of the three types of circular disks are expressed by the following formulae (7) to (9), respectively taking into account the thicknesses.

Polar moment of inertia of a rectangular cross-sectional disk:

$$J_{(A)} = (\pi/32) \times H_0 \times B_0^4 \quad (7)$$

Polar moment of inertia of a protruded cross-sectional disk:

$$J_{(B)} = (\pi/32) \times (H_1 \times B_0^4 + H_2 \times B_2^4) \quad (8)$$

Polar moment of inertia of a recessed cross-sectional disk:

$$J_{(C)} = (\pi/32) \times \{(H_1 + H_3) \times B_0^4 - H_3 \times B_3^4\} \quad (9)$$

Based on the formulae (7) to (9), the magnitude relationship among the polar moment of inertia $J_{(A)}$ of a rectangular cross-sectional disk, the polar moment of inertia $J_{(B)}$ of a protruded cross-sectional disk, and the polar moment of inertia $J_{(C)}$ of a recessed cross-sectional disk is expressed by the following formula (10).

$$J_{(B)} < J_{(A)} < J_{(C)} \quad (10)$$

This formula (10) is the conclusion drawn theoretically from Strength of Materials. This conclusion can be understood from the observation from the viewpoint of Strength of Materials that, qualitatively speaking, a cross-sectional shape in which materials are placed in greater proportion in locations farther from the torsion center provides a higher polar moment of inertia.

Accordingly, a recessed cross-sectional disk is the most appropriate shape against a torsional load. It is because that a protruded cross-sectional disk, a rectangular cross-sectional disk and a recessed cross-sectional disk are in order of increasing torsional rigidity.

2-1-2. Shape for Increasing Flexural Rigidity

A typical shape for increasing the flexural rigidity will hereinafter be discussed based on the theory of Strength of Materials. In order to increase the flexural rigidity of an arm A while keeping the weight the same, it is effective to increase the area moment of inertia.

Figure 7A:
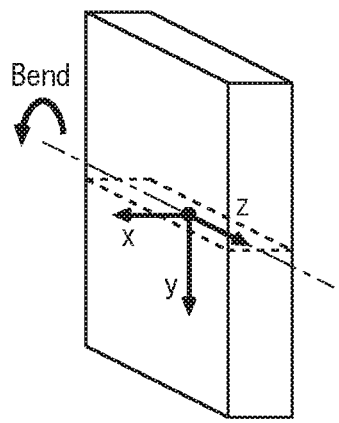
FIG. 7A is a diagram showing a typical example of an arm when the arm is assumed to be a simple beam with a rectangular cross-sectional shape.
Figure 7A:
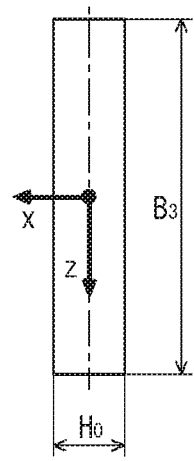
Figure 7B:
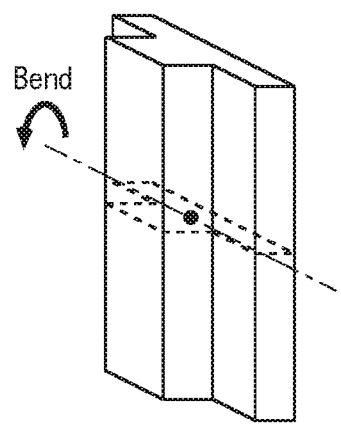
FIG. 7B is a diagram showing a typical example of an arm when the arm is assumed to be a simple beam with a protruded cross-sectional shape.
Figure 7B:
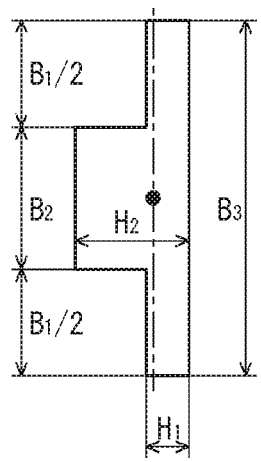
Figure 7C:
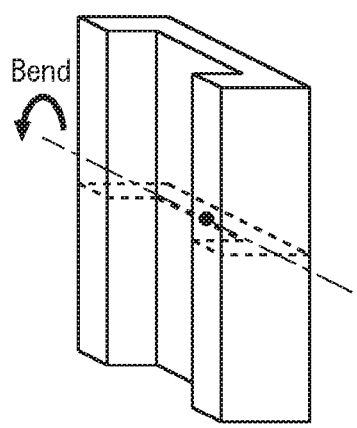
FIG. 7C is a diagram showing a typical example of an arm when the arm is assumed to be a simple beam with a recessed cross-sectional shape.
Figure 7C:
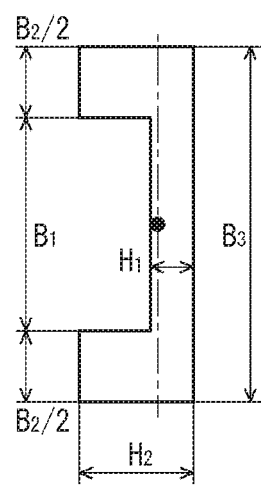

FIGS. 7A to 7C are diagrams showing typical examples of arms when the arms are assumed to be simple beams from the viewpoint of Strength of Materials, with respect to the flexural rigidity. FIG. 7A shows a rectangular cross-sectional beam, FIG. 7B shows a protruded cross-sectional beam, and FIG. 6C shows a recessed cross-sectional beam. In each of FIGS. 7A to 7C, the upper diagram is a perspective view, and the lower diagram is a sectional view. The rectangular cross-sectional beam shown in FIG. 7A, the protruded cross-sectional beam shown in FIG. 7B and the recessed cross-sectional beam shown in FIG. 7C have the same weight. Accordingly, these beams are the same in volume though the cross-sectional shapes of these beams are different, namely, rectangular, protruded and recessed, respectively.

Specifically, the rectangular cross-sectional beam shown in FIG. 7A has a rectangular cross-sectional shape, a thickness of $H_0$ and a width of $B_3$. The protruded cross-sectional beam shown in FIG. 7B has a protruded cross-sectional shape with a protrusion in the center, that is, the central portion of the protruded cross-sectional beam projects from both side portions thereof. The protruded cross-sectional beam has a full width of $B_3$. The central portion has a thickness of $H_2$ and a width of $B_2$, and each of the side portions has a thickness of $H_1$ and a width of $B_1/2$. The recessed cross-sectional beam shown in FIG. 7C has a recessed cross-sectional shape with a recess in the center, that is, the central portion of the recessed cross-sectional beam is set back from both side portions thereof. The recessed cross-sectional beam has a full width of $B_3$. The central portion has a thickness of $H_1$ and a width of $B_1$, and each of the side portions has a thickness of $H_2$ and a width of $B_2/2$.

The magnitude relationship among these beams in flexural rigidity is investigated under the condition that they are of equal weight. In general, according to the theory of Strength of Materials, there are relationships between the flexural rigidity and the area moment of inertia of a beam as shown in the following formulae (11) to (13). The relationships shown in the formulae indicate that increasing the area moment of inertia is effective at increasing the flexural rigidity.

Flexural rigidity: $E \times I$ (11)

Area moment of inertia: $I = (1/12) \times b \times h^3$ (12)

Flexural displacement: $u = k(M/(E \times I))$ (13)

where b represents the width, h represents the thickness, E represents the Young's modulus, M represents the bending moment, and k represents the shape factor.

The condition that the three types of beams shown in FIGS. 7A to 7C are of equal weight means the condition that they are of equal volume, i.e., they are of equal cross-sectional area. Accordingly, the relationship indicated by the following formula (14) is established among the dimensional parameters of the three types of beams.

$$B_3 \times H_0 = (H_2 \times B_2 + B_1 \times H_1) = (H_2 \times B_2 + B_1 \times H_1) \quad (14)$$

The area moments of inertia of the three types of beams are expressed by the following formulae (15) to (17), respectively.

Area moment of inertia of a rectangular cross-sectional beam:

$$I_{(D)} = (1/12) \times B_3 \times H_0^3 \quad (15)$$

Area moment of inertia of a protruded cross-sectional beam:

$$I_{(E)} = 1/3 \times (B_3 \times E_2^3 - B_1 \times H_3^3 + B_2 \times E_1^3) \quad (16)$$

where $E_2$ is determined by "$(B_2 \times H_2^2 + B_1 \times H_1^2)/\{2 \times (B_2 \times H_2 + B_1 \times H_1)\}$", $E_1$ is determined by "$H_2 - E_2$", and $H_3$ is determined by "$E_2 - H_1$".

Area moment of inertia of a recessed cross-sectional beam:

$$I_{(F)} = 1/3 \times (B_3 \times E_2^3 - B_1 \times H_3^3 + B_2 \times E_1^3) \quad (17)$$

where $E_2$ is determined by "$(B_2 \times H_2^2 + B_1 \times H_1^2)/\{2 \times (B_2 \times H_2 + B_1 \times H_1)\}$", $E_1$ is determined by "$H_2 - E_2$", and $H_3$ is determined by "$E_2 - H_1$".

The above formulae (16) and (17) are in the same form. This indicates that the area moment of inertia $I_{(E)}$ of a protruded cross-sectional beam equals the area moment of inertia $I_{(F)}$ of a recessed cross-sectional beam under the condition that they are of equal weight.

In short, the magnitude relationship among the area moment of inertia $I_{(D)}$ of a rectangular cross-sectional beam, the area moment of inertia $I_{(E)}$ of a protruded cross-sectional beam, and the area moment of inertia $I_{(F)}$ of a recessed cross-sectional beam is expressed by the following formula (18).

$$I_{(D)} < I_{(E)} = I_{(F)} \qquad (18)$$

This formula (18) is the conclusion drawn theoretically from Strength of Materials. This conclusion can be understood from the observation from the viewpoint of Strength of Materials that, qualitatively speaking, a cross-sectional shape in which materials are placed in greater proportion in locations farther from the neutral plane of bending provides a higher area moment of inertia.

Accordingly, a protruded cross-sectional beam and a recessed cross-sectional beam are appropriate shapes against a flexural load. It is because a protruded cross-sectional beam with a thickened portion and a recessed cross-sectional beam with thickened portions are comparable in flexural rigidity to each other and are higher in flexural rigidity than a rectangular cross-sectional beam.

Figure 8:
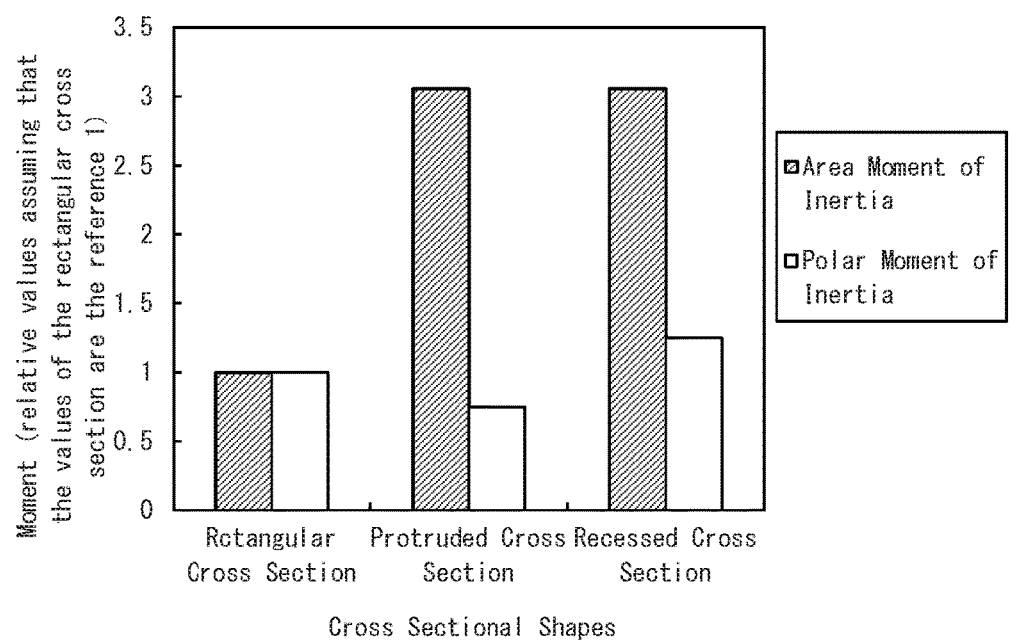
FIG. 8 is a graph summarizing the magnitude relationships among the cross-sectional shapes in area moment of inertia and in polar moment of inertia, which are directly related to flexural rigidity and torsional rigidity.

2-1-3. Summarization of Shapes for Increasing Flexural Rigidity and Torsional Rigidity FIG. 8 is a graph summarizing the magnitude relationships among the cross-sectional shapes in area moment of inertia and in polar moment of inertia, which are directly related to flexural rigidity and torsional rigidity. FIG. 8 shows the polar moments of inertia and the area moments of inertia resulting from the rectangular cross-sectional shapes, the protruded cross-sectional shapes and the recessed cross-sectional shapes shown in FIGS. 6A to 6C and FIGS. 7A to 7C, and the values indicated in FIG. 8 are relative values assuming that the values of the rectangular cross-sectional shapes are the reference "1".

The results shown in FIG. 8 indicate that an effective way to increase both the flexural rigidity and the torsional rigidity of an arm is to increase the thickness of the arm. Especially by designing the arm to have a recessed cross-sectional shape, it becomes possible to increase the flexural rigidity and the torsional rigidity.

2-2. Overview of Crankshaft According to Present Embodiment

According to the present embodiment, at least one of the arms of the crankshaft has a recess in the pin-facing surface. The arm having a recess may be an arm with a weight, and all or some of the arms with weights each may have a recess. In such an arm having a recess, a rib is not formed along the arm centerline across the recess, but two ribs are formed respectively in two side portions of the recess. Then, the two side portions are thickened by the ribs, and the area inside of the side portions are thinned by the recess. The arm has a recessed cross-sectional shape. The crankshaft according to the present embodiment, therefore, can achieve an increase in flexural rigidity and an increase in torsional rigidity as well as a reduction in weight.

The crankshaft according to the present embodiment may have only one rib in one of the two side portions of the recess. Then, the arm is thickened by the rib formed in one side portion. Even in this case, an increase in flexural rigidity and an increase in torsional rigidity as well as a reduction in weight can be achieved. However, in order to increase the flexural rigidity and the torsional rigidity more effectively, it is preferred that two ribs are formed respectively in the two side portions of the recess.

2-3. Specific Examples
[First Embodiment]

Figure 9A:
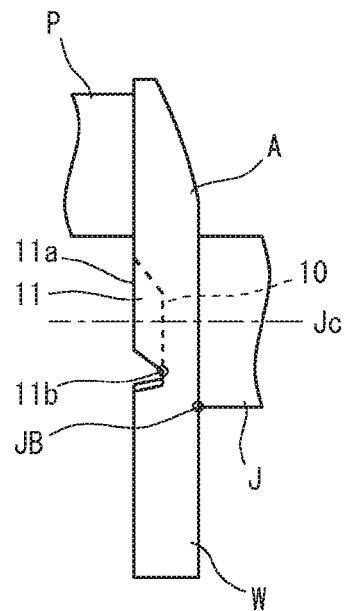
FIG. 9A is a diagram showing an exemplary arm shape for a crankshaft according to a first embodiment, the diagram being a side view of an arm.
Figure 9B:
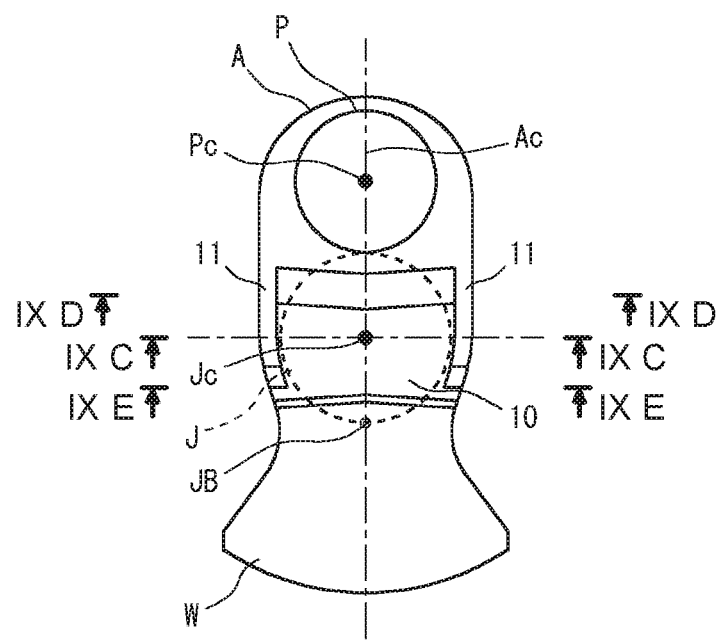
FIG. 9B is a diagram showing the exemplary arm shape for the crankshaft according to the first embodiment, the diagram being a front view when the arm is viewed from a pin side in the axial direction.
Figure 9C:
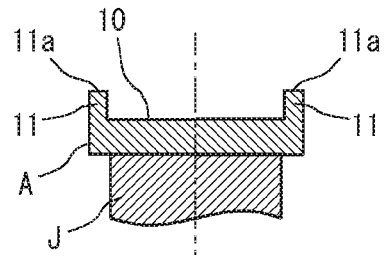
FIG. 9C is a sectional view along the line IXC-IXC in FIG. 9B.
Figure 9D:
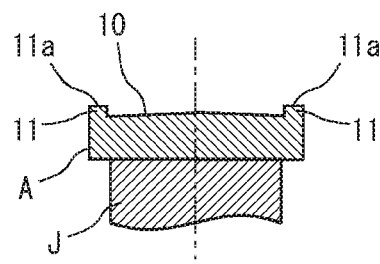
FIG. 9D is a sectional view along the line IXD-IXD in FIG. 9B.
Figure 9E:
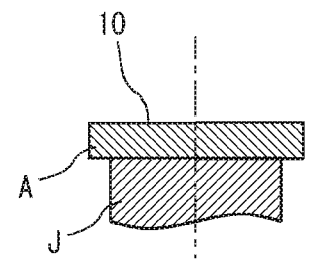
FIG. 9E is a sectional view along the line IXE-IXE in FIG. 9B.

FIGS. 9A to 9E are diagrams showing an exemplary arm shape for a crankshaft according to a first embodiment. FIG. 9A is a side view, and FIG. 9B is a front view when the arm is viewed from a pin side in the axial direction. FIG. 9C is a sectional view along the line IXC-IXC in FIG. 9B, and FIG. 9D is a sectional view along the line IXD-IXD in FIG. 9B, and FIG. 9E is a sectional view along the line IXE-IXE in FIG. 9B. The section shown in FIG. 9C along the line IXC-IXC in FIG. 9B is a section that is perpendicular to the arm centerline Ac connecting the axis Jc of the journal J and the axis Pc of the pin P and passes through the center of rotation of the crankshaft (the axis Jc of the journal J). The section shown in FIG. 9D along the line IXD-IXD in FIG. 9B is a section that is parallel to the section along the line IXC-IXC and passes through a point shifted off from the center of rotation of the crankshaft toward the pin P. The section shown in FIG. 9E along the line IXE-IXE in FIG. 9B is a section that is parallel to the section along the line IXC-IXC and passes through a point shifted off from the center of rotation of the crankshaft toward the weight W. The crankshaft according to the first embodiment may be a four-cylinder eight-counterweight crankshaft or may be a four-cylinder four-counterweight crankshaft.

According to the first embodiment, as shown in FIGS. 9A to 9E, an arm A with a weight W has a recess 10 in the pin P-facing surface, and the recess 10 extends across the entire width of the arm A (extends through the arm A in a width direction, that is, in a direction perpendicular to the arm centerline Ac). Ribs 11 are disposed in two side portions (two end portions in the width direction) of the recess 10, and the ribs 11 extend along the outer periphery of the arm A. The end portion of the recess 10 bordering the weight W extends from one side to the other side of the arm A, and the ribs 11 do not reach this portion (see FIG. 9E). In other words, the ribs 11 extend from the end of the recess 10 near the pin P to a point shifted off from the center of rotation of the crankshaft toward the weight W.

For example, as shown in FIG. 9A, when the arm A is viewed from a side, the end 11b of the rib 11 near the weight W is located in a range from the axis of the journal J to a point JB nearest to the weight W among the points of intersection between the outer periphery of the journal J and the arm A. This is because the increase in stiffness becomes saturated even when the rib 11 extends so long that the end 11b is beyond the point JB. There is no limit to the shape of the top face 11a of the rib 11. However, the end 11b of the rib 11 is unconnected to the end of the weight W. In other words, the rib 11 ends in the range of the recess.

Accordingly, the two side portions of the arm A are thickened by two such ribs 11 formed respectively in two side portions of the arm A, and the area inside of the side portions is thinned by the recess 10. Consequently, the weight of the crankshaft is reduced, and the flexural rigidity and the torsional rigidity of the crankshaft are increased. While the crankshaft is rotating in an engine, the lubricant is effectively stirred because the ribs 11 end in the range of the recess. Thus, the ribs 11 contribute not only to an increase in stiffness but also to stirring of the lubricant.

[Second Embodiment]

Figure 10A:
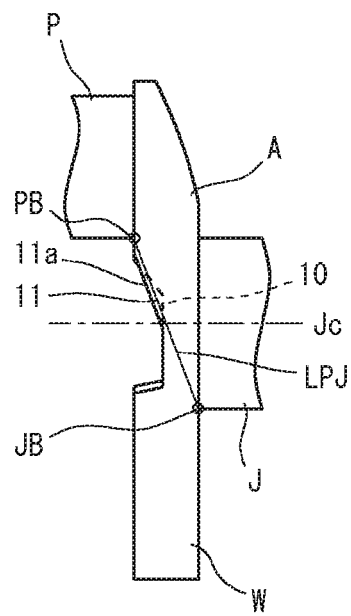
FIG. 10A is a diagram showing an exemplary arm shape for a crankshaft according to a first embodiment, the diagram being a side view of an arm.
Figure 10B:
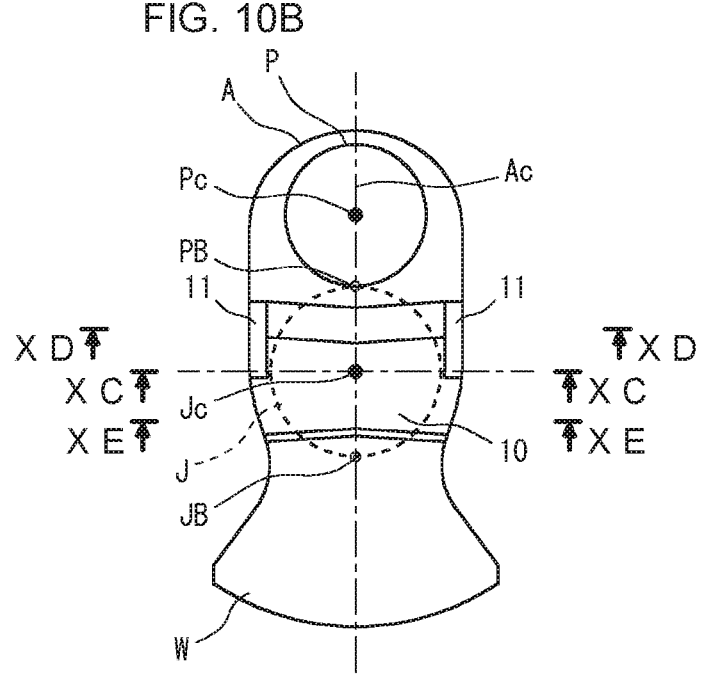
FIG. 10B is a diagram showing the exemplary arm shape for the crankshaft according to the second embodiment, the diagram being a front view when the arm is viewed from a pin side in the axial direction.
Figure 10C:
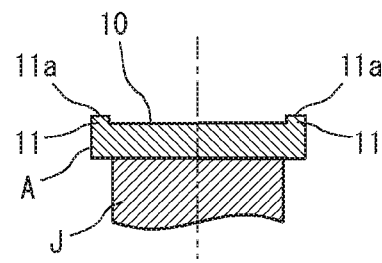
FIG. 10C is a sectional view along the line XC-XC in FIG. 10B.
Figure 10D:
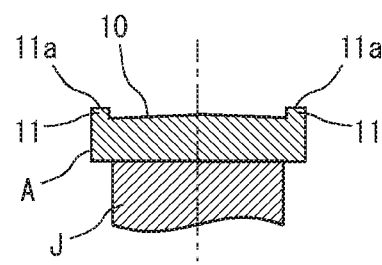
FIG. 10D is a sectional view along the line XD-XD in FIG. 10B.
Figure 10E:
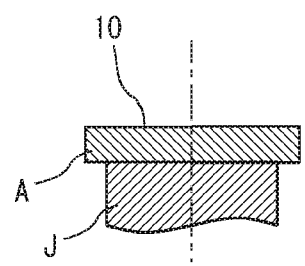
FIG. 10E is a sectional view along the line XE-XE in FIG. 10B.

FIGS. 10A to 10E are diagrams showing an exemplary arm shape for a crankshaft according to a second embodiment. FIG. 10A is a side view, and FIG. 10B is a front view when the arm is viewed from a pin side in the axial direction. FIG. 10C is a sectional view along the line XC-XC in FIG. 10B, and FIG. 10D is a sectional view along the line XD-XD in FIG. 10B, and FIG. 10E is a sectional view along the line XE-XE in FIG. 10B. The position of the section line XC-XC in FIG. 10B for FIG. 10C, the position of the section line XD-XD in FIG. 10B for FIG. 10D, and the position of the section line XE-XE in FIG. 10B for FIG. 10E correspond to the position of the section line IXC-IXC for FIG. 9C, the position of the section line IXD-IXD for FIG. 9D, and the position of the section line IXE-IXE for FIG. 9E, respectively.

The structure of the arm A according to the second embodiment shown in FIGS. 10A to 10E is based on the structure of the arm A according to the first embodiment shown in FIG. 9A to 9E, and the arm A according to the second embodiment is partly modified from the arm according to the first embodiment. According to the second embodiment, as shown in FIG. 10A, a straight line LPJ is drawn to connect a point PB nearest to the weight W among the points of intersection between the outer periphery of the pin P and the arm A and a point JB nearest to the weight W among the points of intersection between the outer periphery of the journal J and the arm A. When the arm A is viewed from a side, the top faces 11a of the ribs 11 are parallel to the line LPJ.

When a flexural load is applied to the arm A, the flexural load is transmitted in the arm A along the line LPJ. Therefore, when the top faces 11a of the ribs 11 are parallel to the line LPJ, the ribs 11 absorb the flexural load efficiently.

The arm A according to the second embodiment having this structure has the same effects as the arm according to the first embodiment. In the second embodiment, it is possible to minimize the size of the ribs 11 while ensuring a high flexural rigidity by the ribs 11. Thus, the second embodiment is effective to further reduce the weight of the whole crankshaft.

[Third Embodiment]

Figure 11A:
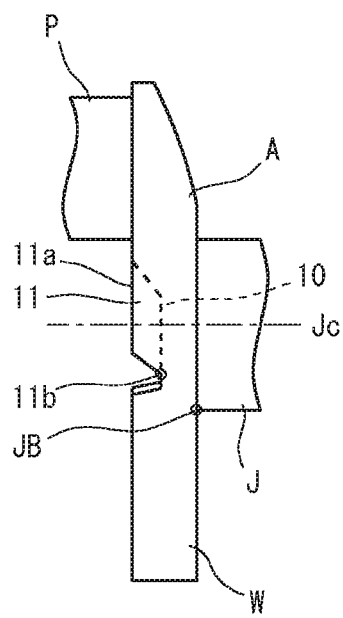
FIG. 11A is a diagram showing an exemplary arm shape for a crankshaft according to a third embodiment, the diagram being a side view of an arm.
Figure 11B:
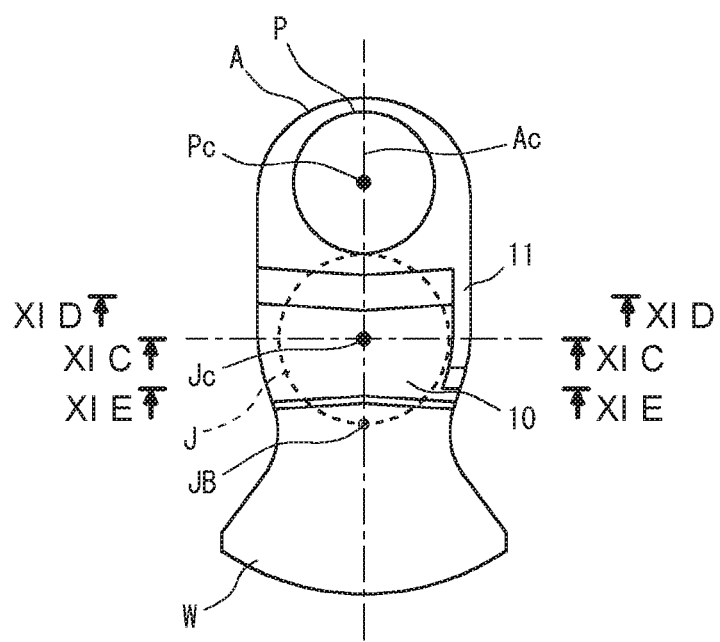
FIG. 11B is a diagram showing the exemplary arm shape for the crankshaft according to the third embodiment, the diagram being a front view when the arm is viewed from a pin side in the axial direction.
Figure 11C:
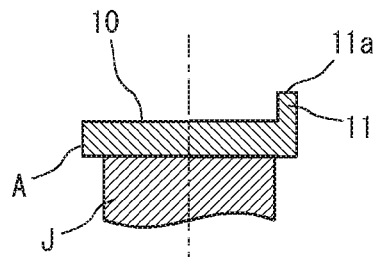
FIG. 11C is a sectional view along the line XIC-XIC in FIG. 11B.
Figure 11D:
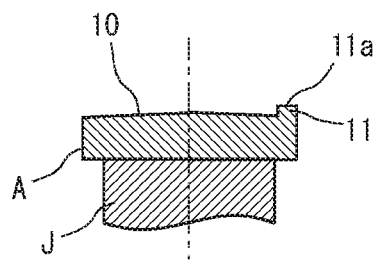
FIG. 11D is a sectional view along the line XID-XID in FIG. 11B.
Figure 11E:
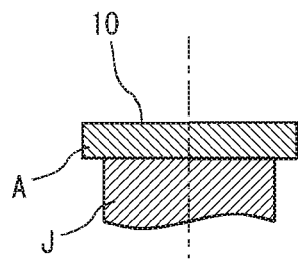
FIG. 11E is a sectional view along the line XIE-XIE in FIG. 11B.

FIGS. 11A to 11E are diagrams showing an exemplary arm shape for a crankshaft according to a third embodiment. FIG. 11A is a side view, and FIG. 11B is a front view when the arm is viewed from a pin side in the axial direction. FIG. 11C is a sectional view along the line XIC-XIC in FIG. 11B, and FIG. 11D is a sectional view along the line XID-XID in FIG. 11B, and FIG. 11E is a sectional view along the line XIE-XIE in FIG. 11B. The position of the section line XIC-XIC in FIG. 11B for FIG. 11C, the position of the section line XID-XID in FIG. 11B for FIG. 11D, and the position of the section line XIE-XIE in FIG. 11B for FIG. 11E correspond to the position of the section line IXC-IXC for FIG. 9C, the position of the section line IXD-IXD for FIG. 9D and the position of the section line IXE-IXE for FIG. 9E, respectively.

The structure of the arm A according to the third embodiment shown in FIGS. 11A to 11E is based on the structure of the arm A according to the first embodiment shown in FIG. 9A to 9E, and the arm A according to the third embodiment is partly modified from the arm according to the first embodiment. According to the third embodiment, as shown in FIGS. 11B to 11D, a rib 11 is formed only in one of the two side portions (both end portions in the width direction) of the recess 10.

In this structure, one side portion of the arm A is thickened by the rib 11. Even in this case, an increase in flexural rigidity and an increase in torsional rigidity as well as a reduction in weight can be achieved. This structure according to the third embodiment may be applied to the second embodiment.

The present invention is directed to crankshafts to be mounted in a variety of reciprocating engines. Specifically, the engine may have any number of cylinders, for example, two cylinders, three cylinders, six cylinders, eight cylinders or ten cylinders, and even more cylinders. The cylinder arrangement may be of any type, for example, in-line type, V-type, opposed type or the like. The fuel for the engine may be of any kind, for example, gasoline, diesel, biofuel or the like. Also, the engines include a hybrid engine consisting of an internal-combustion engine and an electric motor.

INDUSTRIAL APPLICABILITY

The present invention is capable of being effectively utilized in crankshafts to be mounted in a variety of reciprocating engines.

DESCRIPTION OF REFERENCE SYMBOLS

1: crankshaft
J, J1 to J5: journal
Jc: axis of journal
P, P1 to P4: crank pin
Pc: axis of crank pin
Fr: front part
Fl: flange
A, A1 to A8: crank arm
Ac: arm centerline
W, W1 to W8: counterweight
PB: point nearest to counterweight among the points of intersection between outer periphery of pin and arm
JP: point nearest to counterweight among the points of intersection between outer periphery of journal and arm
2: dumper pulley
3: fly wheel
10: recess
11: rib
11a: top face of rib

The invention claimed is:

1. A crankshaft to be mounted in a reciprocating engine, the crankshaft including journals serving as a central axis of rotation, crank pins decentered from the journals, and crank arms connecting the journals and the crank pins, the crank pins being on a first end of a pair of the crank arms, the journals being on a second end of the crank arms opposite to the first end of the crank arms, wherein:
at least one of the crank arms has a counterweight integrated therewith on the second end of the at least one crank arm;
at least one of the crank arms in a selected pair of crank arms having one of the crank pins, one of the counterweights and a recess in a crank pin-facing surface, the recess extending entirely between the one crank pin and the one counterweight so as to not overlap with the one crank pin; and
the at least one crank arm includes a first rib formed only along part of a first side portion of the recess along a first periphery of the one crank arm.

2. The crankshaft according to claim 1, wherein
the one crank arm has a second rib formed only along a part of a second side portion of the recess along a second periphery of the one crank arm.

3. The crankshaft according to claim 2, wherein:
the first rib or the second rib extends from an end of the recess nearest to the one crank pin, to a point past the axis of rotation of the crankshaft toward the one counterweight; and
when the one crank arm is viewed from a side, an end of the first rib or the second rib nearest to the one counterweight is located in a range of the recess, the range being from a point of the axis of rotation of the crankshaft to a point nearest to the one counterweight among points of intersection between an outer periphery of one of the journals and the one crank arm, the one journal being on the second end of the one crank arm.

4. The crankshaft according to claim 3, wherein:

when the one crank arm is viewed from the side, a face of the first rib or the second rib is parallel to a straight line connecting a point nearest to the one counterweight among points of intersection between an outer periphery of the one crank pin and the one crank arm, and a point nearest to the one counterweight among points of intersection between the outer periphery of the one journal and the one crank arm.

5. The crankshaft according to claim 1, wherein:

the first rib extends from an end of the recess nearest to the one crank pin to a point past the axis of rotation of the crankshaft toward the one counterweight; and when the one crank arm is viewed from a side, an end of the first rib nearest to the one counterweight is located in a range of the recess, the range being from a point of the axis of rotation of the crankshaft to a point nearest to the one counterweight among points of intersection between an outer periphery of one of the journals and the one crank arm, the one journal being on the second end of the one crank arm.

6. The crankshaft according to claim 5, wherein:

when the one crank arm is viewed from the side, a face of the first rib is parallel to a straight line connecting a point nearest to the one counterweight among points of intersection between an outer periphery of the one crank pin and the one crank arm, and a point nearest to the one counterweight among points of intersection between the outer periphery of the one journal and the one crank arm.

* * * * *